US007690823B2

United States Patent
Miguel Sanz et al.

(10) Patent No.: US 7,690,823 B2
(45) Date of Patent: Apr. 6, 2010

(54) LIGHTING ASSEMBLY WITH SAFETY AND SIGNALLING FUNCTIONS FOR MOTOR VEHICLES

(75) Inventors: Santiago Miguel Sanz, Hospitalet de Llobregat (ES); Daniel Bande Martinez, Barcelona (ES); Maria Luisa Novella Requena, Terrassa (ES)

(73) Assignee: FICO Mirrors, S.A., Barcelona (ES)

( * ) Notice: Subject to any disclaimer, the term of this patent is extended or adjusted under 35 U.S.C. 154(b) by 342 days.

(21) Appl. No.: 11/547,591

(22) PCT Filed: Apr. 4, 2005

(86) PCT No.: PCT/IB2005/000870

§ 371 (c)(1), (2), (4) Date: Feb. 29, 2008

(87) PCT Pub. No.: WO2005/098310

PCT Pub. Date: Oct. 20, 2005

(65) Prior Publication Data

US 2008/0219020 A1    Sep. 11, 2008

(30) Foreign Application Priority Data

Apr. 5, 2004    (ES) ............................. 200400941

(51) Int. Cl.
B60Q 1/32 (2006.01)
(52) U.S. Cl. .................... 362/494; 362/546; 362/545
(58) Field of Classification Search .............. 362/494, 362/492, 135, 136, 546, 509, 543, 544, 545; 359/606; 340/475

See application file for complete search history.

(56) References Cited

U.S. PATENT DOCUMENTS

| 5,355,284 | A | * | 10/1994 | Roberts | 362/494 |
|---|---|---|---|---|---|
| 5,361,190 | A | * | 11/1994 | Roberts et al. | 362/464 |
| 5,788,357 | A | * | 8/1998 | Muth et al. | 362/494 |
| 6,045,243 | A | * | 4/2000 | Muth et al. | 362/494 |
| 6,450,661 | B1 | | 9/2002 | Okumura | |
| 7,334,923 | B2 | * | 2/2008 | Tanaka et al. | 362/494 |
| 2003/0025450 | A1 | | 2/2003 | Katayama et al. | |
| 2003/0086276 | A1 | | 5/2003 | Ohtsuka et al. | |

FOREIGN PATENT DOCUMENTS

| JP | 07-015047 | 1/1995 |
|---|---|---|
| JP | 2003-248435 | 9/2003 |

OTHER PUBLICATIONS

International Search Report for PCT International Application No. PCT/IB2005/000870 mailed Aug. 3, 2005.

* cited by examiner

Primary Examiner—Bao Q Truong
(74) Attorney, Agent, or Firm—RatnerPrestia

(57) ABSTRACT

Comprises in combination: at least one light source; a support plate for the light source, which is at least one; a protective cover that permits the light emitted by the light source to reach the outside; at least one wall which, in combination with the cover, forms a casing to hold the said light source, in which at least the said support plate has a black coloured surface facing the said cover; and in which the position of said light source, which is at least one, in relation to the casing, is such that it emits the light directly to the exterior.

27 Claims, 2 Drawing Sheets

LIGHTING ASSEMBLY WITH SAFETY AND SIGNALLING FUNCTIONS FOR MOTOR VEHICLES

This application is a U.S. National Phase application of PCT International Application No. PCT/IB2005/000870. filed Apr. 4. 2005.

TECHNIQUE SECTION

This invention in general concerns a lighting assembly with safety and signalling functions for motor vehicles, and more particularly a lighting assembly adapted to work under adverse outside lighting conditions.

PREVIOUS STATE OF THE ART

There are numerous lighting assemblies with safety and signalling functions for motor vehicles to illuminate different areas adjacent to the vehicle.

Generally these assemblies have the disadvantage that their performance is considerably reduced under adverse outside lighting conditions as they incorporate a reflecting element at the back as well as a generally transparent cover, the sun strikes directly on the reflector and makes it extremely difficult to see the light emitted by the light sources fitted to these lighting assemblies.

It is therefore of interest to propose a lighting assembly that exceeds the state of the art in regard to maintaining its performance under the abovementioned adverse lighting conditions, that is one that is not prejudiced by sunlight striking it.

EXPLANATION OF THE INVENTION

This invention concerns, in a first aspect, a lighting assembly with safety and signalling functions for motor vehicles, comprised of, in combination:
- at least one light source;
- a support plate for the light source, which is at least one;
- a protective cover that permits the light emitted by the light source to reach the outside;
- at least one wall which, in combination with the cover, forms a casing to hold the said light source, in which at least said support plate has a black coloured surface facing the said cover; and in which the position of said light source, which is at least one, in relation to the casing, is such that it emits the light directly to the exterior.

Preferably said wall has a surface facing the cover, at least part of which is black in colour.

A second aspect of the invention proposes an assembly of an exterior rear-view mirror for a motor vehicle which incorporates a lighting assembly as described in the first aspect of the invention.

A third aspect of the invention concerns the use of a light source as mentioned in the first aspect of the invention to constitute an exterior rear-view mirror assembly for a motor vehicle.

A fourth aspect of the invention involves the use of a cover, plate and wall as described in the first aspect of the invention to constitute a module with safety or signalling functions that can be placed on a motor vehicle.

BRIEF DESCRIPTION OF THE DRAWINGS

The above, and other characteristics and advantages of the invention can be more clearly appreciated from the following description of a series of examples, some of which are illustrated in the attached drawings and which should be considered as illustrative only and not limiting in any way.

In these drawings.

DETAILED DESCRIPTION OF SOME EMBODIMENT EXAMPLES

As shown in the figures, the lighting assembly with safety and signalling functions for motor vehicles proposed by this invention comprises, in combination:
- at least one light source 1;
- a support plate 2 for the light source 1, which is at least one;
- protective cover 3 that permits the light emitted by the light source 1 to reach the outside;
- a wall 4 which, in combination with the cover 3, forms a casing to hold the said light source 1, in which at least said support plate 2 has a black coloured surface facing the said cover 3; and in which the position of said light source 1, which is at least one, in relation to the casing, is such that it emits the light directly to the exterior.

Preferably said wall 4, which is at least one, has a surface facing the cover 3, at least in part of which is black in colour, and more preferably (see FIG. 1) all black.

Figure 2:
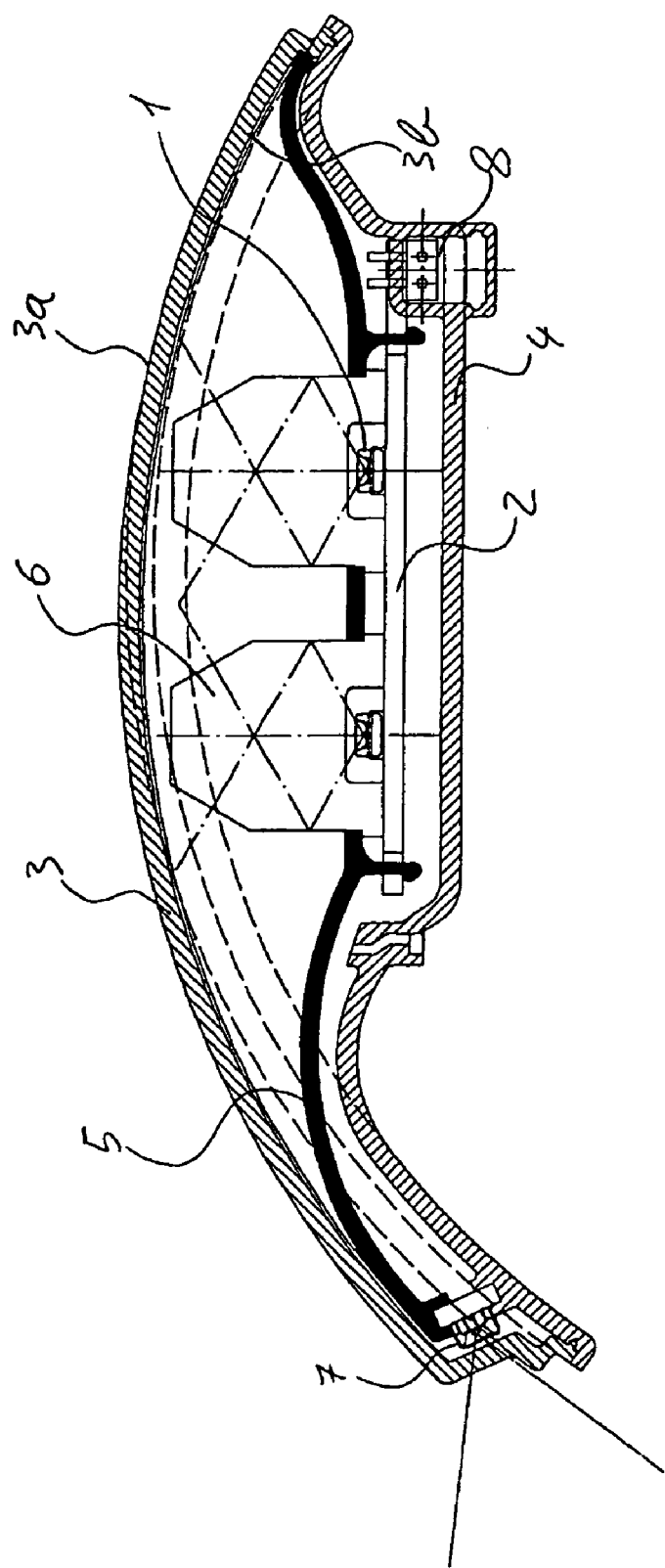
FIG. 2 shows, also in cross section, another embodiment example, a lighting assembly similar to that of FIG. 1 but also comprised of an intermediate part, between the cover and the back wall, and a polyhedral prism located on some of the light sources shown.

FIG. 2 shows another embodiment example in which the assembly proposed furthermore comprises an intermediate part 5, placed between the wall 4 and the cover 3, which has a black surface facing the cover 3. In this case the wall 4 may not necessarily be black, as the said intermediate part 5 provides a black background for the assembly to prevent any reflection of outside light.

Said cover 3 is of a material, normally perspex, that transmits a predetermined percentage of light from the light source 1, which is at least one, so that there is a reduction of the parasitic reflections derived from the environmental light that shines on the exterior surface 3a of the cover 3 and at the same time reduces the visibility of said light source 1. Said material is generally a synthetic material with certain additives that define the said percentage of transmission of the light, which provides a quality of darkening equivalent to that of "smoked glass".

Furthermore the interior surface 3b of said cover 3 has a geometry (see FIG. 1) that enables directed, amplified or uniform distribution, through said cover 3, of the light proceeding from the said light source 1, which is at least one.

The power of said light source 1, which is at least one, is determined by the characteristics of the material of said cover 3, the geometry of its internal face 3b or both.

Generally at least part of the components of said assembly have been obtained by injection moulding, although any another manufacturing process which an expert in the material considers suitable would be possible.

The lighting assembly proposed is in general comprised of various of said light sources, the figures show two embodiment examples which include four of said light sources, one of which constitutes a turn indicator 7 for a motor vehicle, which emits with a predetermined intensity and horizontal and vertical angles through an area of said cover 3, to comply with current regulations in order to obtain the corresponding approval.

The light sources 1, as shown in the figures, are preferably of the LED type.

The proposed assembly also includes, in front of said light source 1 of LED type, an optical element 6 to generate optical effects of amplification, dispersion, diffusion or multiplication of the light emitted.

Said optical element 6 is, preferably, a transparent polyhedral prism, at least in part (see FIG. 2), although it may also be a truncated conical structure, in whose smaller base there is a lens, facing the light source 1, a lens or a Fresnel lens, or any combination of the above, including a polyhedral prism.

In general said support plate 2 of the light sources 1 includes a support for a printed circuit, in which there is at least a means of connection 8 for said light source 1, although normally it also includes a series of electronic components that form part the associated circuitry.

Figure 1:
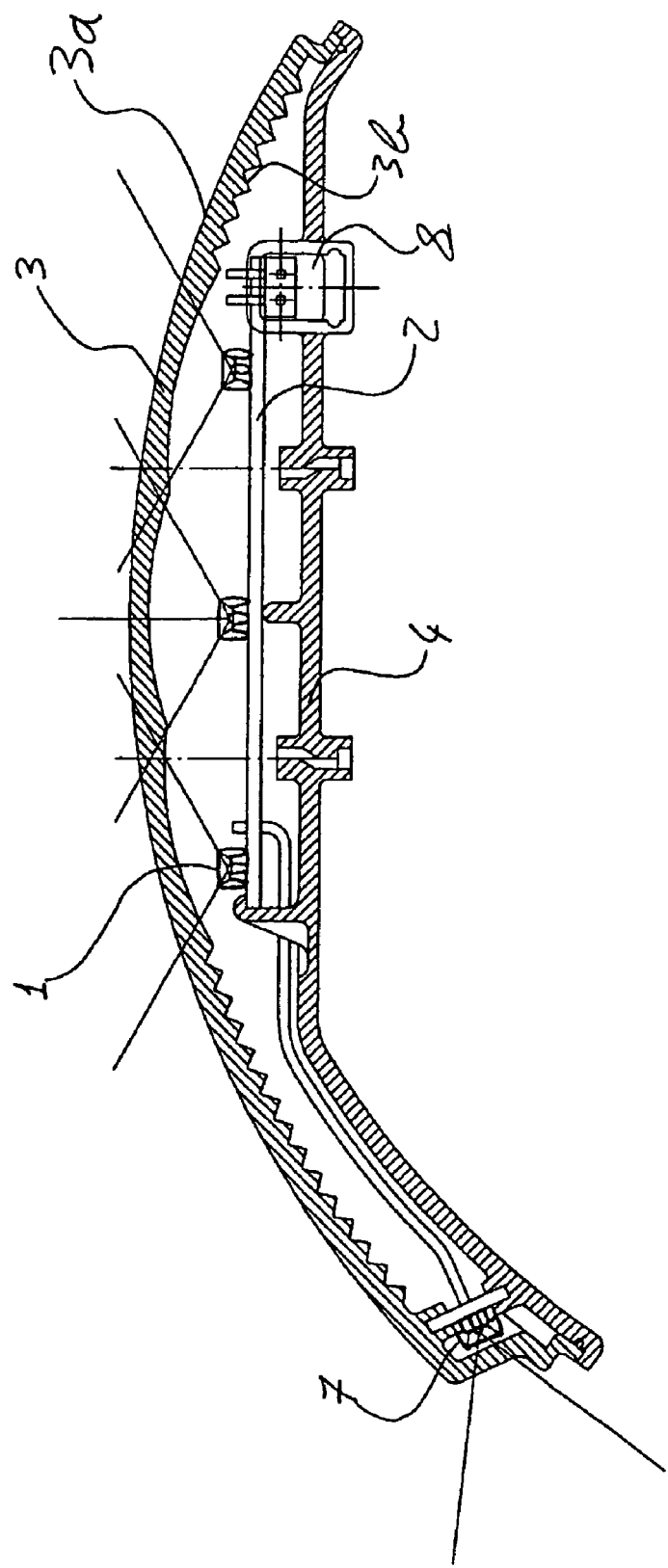
FIG. 1 shows, in cross section, the lighting assembly proposed for this invention for an embodiment example in which there are various light sources, a cover and a backing wall which, in conjunction with the cover, define a casing for the said light sources.

For the embodiment example shown in FIG. 2 said support plate 2 of the light sources 1 is held by said intermediate part 5 and in the embodiment example shown in FIG. 1 it is held by the wall 4.

The invention also proposes an assembly of an exterior rear-view mirror for a motor vehicle (not shown) which incorporates the proposed lighting assembly.

An expert in the matter could include changes and modifications to the embodiment examples described without exceeding the scope of the invention as defined in the enclosed claims.

The invention claimed is:

1. A lighting assembly with safety and signalling functions for motor vehicles comprised of, in combination:
    at least one light source;
    a support plate for the light source, which is at least one;
    a protective cover that permits the light emitted by the light source to reach the outside;
    at least one wall which, in combination with the cover, forms a casing to hold the said light source,
    in which at least the support plate has a black coloured surface, under said at least one light source, and facing said cover;
    in which the position of said at least one light source, in relation to the casing, is such that said at least one light source emits the light directly to the exterior; and
    said cover, plate and wall providing along with said at least one light source a module with safety or signalling functions to be fitted to an exterior rear-view mirror assembly of a motor vehicle.

2. The assembly, according to claim 1, in which said wall, which is at least one, has a surface facing the cover, at least in part black in colour.

3. The assembly, according to claim 1, in which said wall, which is at least one, has a surface facing the cover, all of which is black in colour.

4. The assembly, according to claim 1, which furthermore comprises an intermediate part, placed between said wall and said cover, which has a black surface facing the cover.

5. The assembly, according to claim 1, in which the cover is of a material that transmits a predetermined percentage of light from the light source, which is at least one, so that there is a reduction of the parasitic reflections derived from the environmental light that shines on the exterior surface of the cover and at the same time reduces the visibility of said light source.

6. The assembly, according to claim 5, in which the interior surface of said cover has a geometry that enables directed, amplified or uniform distribution, through said cover, of the light proceeding from the light source, which is at least one.

7. The assembly, according to claim 6, in which the interior surface of said cover has a geometry that enables directed, amplified or uniform distribution, through said cover, of the light proceeding from the light source, which is at least one, and in which the power of said light source, which is at least one, is determined by the characteristics of the material of said cover, the geometry of its internal face or both.

8. The assembly, according to claim 5, in which said material is synthetic material with additives that define the percentage of light transmission.

9. The assembly, according to claim 5 in which said material is synthetic material with additives that define the said percentage of light transmission, and in which said synthetic material provides a quality of darkening equivalent to that of "smoked glass".

10. The assembly, according to claim 1, in which at least part of the components of said assembly have been obtained by injection moulding.

11. The assembly, according to claim 1, comprised of several of the light sources.

12. The assembly, according to claim 11, in which at least one of the light sources constitutes a turn indicator for a motor vehicle.

13. The assembly, according to claim 11, in which at least one of the light sources constitutes a turn indicator for a motor vehicle, and in which said light source which acts as a turn indicator emits with a predetermined intensity and horizontal and vertical angles through an area of the said cover.

14. The assembly, according to claim 1, in which said light source is of the LED type.

15. The assembly, according to claim 14, in which, furthermore, the front of the light source of LED type includes an optical element to generate the optical effects of amplification, dispersion, diffusion or multiplication of the light emitted.

16. The assembly, according to claim 14, in which, furthermore, the front of the light source of LED type includes an optical element to generate the optical effects of amplification, dispersion, diffusion or multiplication of the light emitted, and in which said optical element is a transparent polyhedral prism, at least in part.

17. The assembly, according to claim 14, in which, furthermore, the front of the light source of LED type includes an optical element to generate the optical effects of amplification, dispersion, diffusion or multiplication of the light emitted, and in which said optical element is a truncated conical structure whose smaller base is fitted with a lens facing the light source.

18. The assembly, according to claim 14, in which, furthermore, the front of the light source of LED type includes an optical element to generate the optical effects of amplification, dispersion, diffusion or multiplication of the light emitted, and in which said optical element is a lens.

19. The assembly, according to claim 14, in which, furthermore, the front of the light source of LED type includes an optical element to generate the optical effects of amplification, dispersion, diffusion or multiplication of the light emitted, and in which said optical element is a Fresnel lens.

20. The assembly, according to claim 14, in which, furthermore, the front of the light source of LED type includes an optical element to generate the optical effects of amplification, dispersion, diffusion or multiplication of the light emitted, and in which said optical element is comprised of a combination of any of the following elements: a transparent polyhedral prism, at least in part, a truncated conical structure, in whose smaller base there is a lens, facing the light source, a lens or a Fresnel lens.

21. The assembly, according to claim 1, in which said support plate of said light source, which is at least one, is a support for a printed circuit which includes at least a means of connection for said light source.

22. The assembly, according to claim 4, in which said support plate of said light source, which is at least one, is a support for a printed circuit which includes at least a means of connection for said light source, and in which said support plate of said light source is supported by the said intermediate part.

23. The assembly, according to claim 1, in which said support plate of said light source, which is at least one, is a support for a printed circuit which includes at least a means of connection for said light source, and in which said support plate of said light source is supported by the said wall.

24. The assembly of an exterior rear-view mirror for a motor vehicle that includes a lighting assembly according to claim 1.

25. Use of a light source according to claim 11 to constitute an exterior rear-view mirror assembly for a motor vehicle.

26. The assembly, according to claim 2 in which said wall, which is at least one, has a surface facing the cover, all of which is black in colour.

27. The assembly, according to claim 4, in which said support plate of said light source, which is at least one, is a support for a printed circuit which includes at least a means of connection for said light source.

* * * * *